United States Patent [19]

Hudgin et al.

[11] 3,886,683
[45] June 3, 1975

[54] DEGRADABLE PLASTIC

[75] Inventors: Donald E. Hudgin, Princeton Junction; Murray Reich, Princeton, both of N.J.

[73] Assignee: Princeton Chemical Research, Inc., Princeton, N.J.

[22] Filed: Nov. 27, 1970

[21] Appl. No.: 93,393

[52] U.S. Cl............ 47/9; 260/45.7 P; 260/45.75 N; 260/45.8 NT; 260/45.85 E; 260/45.85 S; 260/45.95 F; 260/45.95 H; 260/45.95 R; 260/DIG. 43
[51] Int. Cl......................... C08f 3/12; C08f 45/58
[58] Field of Search ....... 260/45.7 P, 45.8 N, 45.95, 260/DIG. 43, 45.95 R, 45.85 S; 47/9

[56] References Cited
UNITED STATES PATENTS

| | | | |
|---|---|---|---|
| 2,675,366 | 4/1954 | Pullman | 260/45.95 |
| 3,218,276 | 11/1965 | Ringwald et al. | 260/23 |
| 3,265,648 | 8/1966 | Boor, Jr. et al. | 260/23 |
| 3,266,918 | 8/1966 | Schappel et al. | 106/165 |
| 3,274,731 | 9/1966 | Vigneault et al. | 47/9 |
| 3,280,220 | 10/1966 | Nelson | 260/897 |
| 3,320,695 | 5/1967 | Moore, Jr. | 47/9 |
| 3,341,357 | 9/1967 | Feild | 117/138.8 |
| 3,356,666 | 12/1967 | Rosen et al. | 260/93.7 |
| 3,440,212 | 4/1969 | Tholstrup | 260/45.8 |
| 3,454,510 | 7/1969 | Newland et al. | 260/23 |
| 3,454,523 | 7/1969 | Tholstrup | 260/45.8 |
| 3,502,613 | 3/1970 | Berger | 260/45.8 |
| 3,536,661 | 10/1970 | Hagemeyer, Jr. et al. | 260/45.85 |
| 3,538,092 | 11/1970 | Dexter | 260/248 |
| 3,549,588 | 12/1970 | Kopacki et al. | 260/45.8 |
| 3,580,898 | 5/1971 | Rosen et al. | 260/93.7 |
| 3,590,528 | 7/1971 | Shepherd | 47/9 |
| 3,673,134 | 6/1972 | Anderson | 260/5 |
| 3,679,777 | 7/1972 | Lambert | 260/897 |

OTHER PUBLICATIONS

Gaylord et al., "Linear and Stereoregular Addition Polymers," 1959, page 321.

Primary Examiner—Donald E. Czaja
Assistant Examiner—R. A. White
Attorney, Agent, or Firm—Burgess, Dinklage & Sprung

[57] ABSTRACT

Films and containers are made from polymers of butene-1 such as polybutene-1 which contains a small amount of stabilizer whereby the rapid degradation rate of polybutene-1 can be controlled so that it will degrade after predetermined exposure to sunlight. This renders such products especially suited for agricultural mulch films, where they need not be removed after a growing season, and for throw-away containers where they will decompose in garbage dumps or if discarded as litter. The thermal history of the polymer will also affect its degradation rate.

The rate is measured in terms of thermally adjusted Langley units (TALU) since it has been found that the ambient temperature affects decomposition as well as the Langley units of solar radiation exposure.

3 Claims, No Drawings

DEGRADABLE PLASTIC

The present invention relates to shaped plastic structures which will degrade in predetermined time intervals.

A large proportion of the plastic products which are presently manufactured are intended to be used for relatively limited periods of time, after which the products are usually discarded or otherwise disposed of. Examples of such plastic articles are packaging films; all kinds of food containers such as egg cartons, meat trays, and bottles; beer can holders; containers for beverages such as milk, soft drinks, and beer; disposable clothing; drinking cups, plates, and plastic cutlery; agricultural mulch films; films used for construction purposes such as temporary windows, and films for curing concrete; bottles; containers for detergents and other cleaning agents; containers for motor oils; garbage and litter bags; laundry bags; disposable clothing and diaper liners; disposable baby bottles, cosmetic and pharmaceutical containers; and many others.

In addition, other plastic-containing articles, although intended for more durable uses, are often discarded because of wear and tear, obsolescence, styling changes, or owners becoming tired of them. Such articles include toys, clothing, fabrics, furniture, appliances and automobiles.

In the last decade plastics usage has grown phenomenally, and this growth will undoubtedly continue unabated.

An unhappy side effect of the explosive growth of plastics usage is to aggravate the problem of disposing of solid waste materials in general, and the accumulation of solid wastes over recent years has resulted in severe environmental pollution.

A costly aspect of solid wastes disposal is collection and transportation to the disposal area. Solid wastes are collected on a regular basis in plastic bags, cans, containers, and are picked up as litter on streets, highways, rivers, parks, etc. It is more costly to collect litter than solid waste in a container.

Another expensive aspect of solid waste removal is disposing of the refuse and wastes after they are collected. According to the Federal Bureau of Solid Waste Management, the disposal costs run several times the cost of collection.

The usual method of solid waste disposal is by landfill, which accommodates over 90% of the country's solid waste at about 12,000 landfill sites. The Bureau of Solid Waste Management states that this seemingly simple disposal method presents formidable problems, such as the evolution of noxious gases from some wastes, the leaching of some wastes by ground waters, and continued settling of the fill if it is not properly compacted.

Another serious restriction to the use of landfill as a disposal method is the aversion of the public to the use of land to dispose of waste in their own communities.

Another major method of solid waste disposal in incineration. There have been several recent development in incineration technology including a rotary kiln incinerator which requires that the wastes are classified into those that can be fed to the kiln directly (trash and scrap plastic), pumpable wastes and miscellaneous liquid wastes. However, it was necessary to develop separate feed systems for each category.

Another more serious problem facing state and municipal governments using incinerators is the increased stringency of air pollution control regulations which restrict the amount and the type of air pollutants the incinerator can exhaust to the atmosphere, and require that the incinerator be maintained at high burning efficiency.

Landfill and incineration constitute the two major methods of solid waste. However, a third method of disposal is to transport solid wastes by barge to the ocean and dump them at different sites spaced along the Atlantic, Pacific and Gulf Coast areas. However, recent studies have shown that an ocean dump can create severe upsets in the ecologies of fish and plants in the vicinity of the dump.

Little reclamation of municipal wastes is carried out since the cost of separating out the waste into different categories such as glass, paper, etc. is usually too high.

Plastics also find their uses in agriculture where, as films, they are used as mulch to change the environment of the growing plants and to protect the growing plants from low rainfall, cool air temperatures and cool soil temperatures. Mulch films are used as physical barriers to control weeds, evaporation and leaching.

Low soil temperatures during the spring may reduce plant growth and prolong the growing season. Mulch films can provide higher soil temperatures and cause early plant development. Soil temperatures are increased significantly (over 10°F) by the use of mulch films.

Mulch films are also used to control weed growth. In a typical application, the fields may be fumigated and covered with a plastic film prior to the start of the growing seasons. Fumigation can be done by a special tractor that pumps liquid into the soil and also applies about 2 to 6-foot wide and generally 4-foot wide strips of film on the ground, leaving narrow rows of exposed soil between the strips of film. After about 2–4 weeks, holes are punched in the plastic film and young snap beans pepper, summer squash, eggplant, muskmelons, cucumbers, strawberries and the like are planted through the holes in the plastic. The mulch film raises the soil temperature in the root zone, decreases moisture evaporation and eliminates hoeing which can injure the root system of the plant. Another advantageous effect of the mulch film is that higher levels of carbon dioxide are provided under the film, and this carbon dioxide is released to feed the growing leaves of the plant through the holes punched in the film. Fumigation of the soil and the use of mulch films generally increase markedly the number of vegetables produced and the average weight of the vegetables, and reduces the incidence of parasitic diseases.

Mulch films can also provide improved soil structure by preventing soil compaction and soil crusting. The soil remains loose and friable and provides good aeration for the roots of the plants.

In good soil structure, an extensive root system can develop, especially in the soil close to the plant, where unmulched soil dries, crusts and root growth is limited. Mulch film contributes to a healthy root system.

Accordingly, mulch films are used to conserve soil moisture, and premature leaching of fertilizer, raise soil temperature, fumigate the soil, improve soil structure, increase beneficial microbial activity in the soil, decrease fruit rot, and aid in root development. Mulch films increase crop yields, size of individual crops, cause early maturity of the plant, and minimize the hazards of parasites, and of weather, such as drought, rainfall, and cool weather.

The serious limitation of available commercial mulch films films is that mulch films do not decompose during the growing season and must be removed at the end of the crop season. If the film is not removed, the film becomes entangled in the tillage equipment, interferes with seeding, and root development.

Anti-pollution laws in some places have restricted the disposal of these mulch films to specific locations, thus requiring transporting the used mulch films to these areas.

Accordingly, disposal of presently available mulch films at the end of the growing season is costly, time consuming and contributes to the problem of solid wastes disposal.

Because of the wide variation in growing periods among various crops and for various climatic regions, it is desirable that mulch films do not disintegrate prematurely, otherwise they would no longer remain useful in conserving soil moisture, raising soil temperature, controlling weed growth, and maintaining good soil structure. Neither should the films degrade so slowly that they will interfere with harvesting, or delay soil treatment and preparation, or planting subsequent crops considering the localized and specific needs.

It is an object of the present invention to provide mulch articles which can be disposed of merely by outdoor exposure to sunlight so that they do not require incineration, burial, or dumping for disposal.

It is an object of the present invention to provide a means for disposing of a plastic product, which comprises exposing the product to a specific amount of solar radiation in a specific climate, whereby the product degrades completely and is physically consumed by the natural elements.

Another object of this invention is to provide degradable plastic products which can be manufactured by extrusion, molding, casting, spinning into fibers, forming into films, coatings or laminates, or forming into foams.

A further object is to provide plastic articles which can be manufactured in thickness ranging from a fraction of a mil to thicker than about 100 mils, which will degrade when exposed to outdoor sunlight or other sources of solar-like radiation, and which can be made clear, translucent, or substantially opaque, or can be opacified by stretching such as described in British Pat. Nos. 1,081,271 and 1,070,514 or can be pigmented, dyed, printed, metallized, embossed or decorated.

A further object of the present invention is to provide commercial products which will degrade within a predictable period of exposure to solar radiation in a known climate. For example, agricultural mulch films can be prepared according to the present invention, such that the films will degrade completely at the end of the growing season, in a known climate, for a particular crop under cultivation.

Another object of the invention is to provide agricultural mulch films which degrade to a friable material which very easily disintegrate under the action of tillage equipment, do not interfere with precision seeding, and do not require removal from the field or transportation to a disposal area.

Another object of the present invention is to provide plastic products, such as agricultural mulch films, such that the degradation rates of these products are highly predictable.

Another object of the present invention is to provide degradable agricultural mulch films, whose degradation rates are keyed to and will compensate for the normal year-to-year variations in the maturation periods of crops, particularly due to spells of extreme weather such as unseasonably hot, cool, sunny, or overcast weather.

Other and additional objects will become apparent from a consideration of this entire specification, including the examples hereinafter described, and the claims appended.

In accordance with the present invention, it has now surprisingly been discovered that degradable plastic articles with the useful properties and characteristics such as described above can be prepared by the incorporation of restricted and controlled amounts of antioxidants, stabilizers, or combinations thereof, of the type commonly used in plastics for stabilization during processing or against actinic degradation, into a polymer comprising butene as a major polymer component. The degradation rates of the plastic articles thereby produced depend, in a controllable and predictable manner, on the method and amount of processing necessary to manufacture the article; on the amounts of the specific antioxidants, stabilizers, or combinations thereof incorporated; on the thickness of the article; and on the extent of exposure to sunlight or solar-like radiation.

In addition, it has been found that degradation is not dependent solely upon the amount of solar radiation, usually measured in Langley units, but that it is significantly dependent upon the temperature at which the article is exposed. Thus, to this end the invention provides a measure of the extent to which the Langley unit of solar radiation exposure must be corrected for various or varying temperatures of exposure. In addition, the extent of exposure can be predicted with sufficient accuracy for the uses described herein, by means of readily available statistical meterological data which have been recorded for various geographical locations throughout the world.

Unstabilized butene-1 polymers degrade quickly, and often uncontrollably, and their thermal history in being converted from initial resin to film or container results in even further degradation. By the invention, however, incorporation of stabilizers, e.g. about 0.001 to 30% by weight and preferably 0.01 to 5% by weight, serves to increase the useful life span of the article but yet to leave it degradable. Moreover, the rate of degradation is smoothed out and rendered predictable so that articles can be fabricated which will controllably degrade in about 1 month, 2 months, 6 months, etc..

The plastic materials thus prepared are stable for relatively long or indefinite periods of time during indoor use or storage, such as in a warehouse, on a store shelf, or in the home. During each indoor storage or use, products prepared according to the present invention will not suffer any appreciable losses in the properties which are necessary or desirable for their intended applications; for example, tensile strength, flexibility, elongation, chemical resistance, impermeability to moisture, and the like. Nevertheless, when such articles are exposed to outdoor solar radiation, after a period of time they will begin to degrade, as evidenced by a progressive decrease in tensile strength and elongation at break, until they reach a stage where they can be disintegrated readily by natural elements such as wind, rain, or microorganisms, and thus return to the biological cycle. That is to say, the products prepared according to the present invention degrade in a controllable manner. For example, a mulch film may be prepared according to the present invention for use with a tomato crop which would normally be harvested after about 6 weeks of planting in a particular geographic area, if average weather conditions, i.e., the intensity of solar radiation and the temperatures, were to prevail. However, due to unseasonably cool weather one particular year, the crop is actually harvested about eight weeks after planting. Then the mulch films of the present invention will degrade approximately 2 weeks more slowly so as to compensate for the stretch of cool weather, this resulting from the fact that the same factors which delay crop maturation will delay the film degradation.

STABILIZERS

In the practice of the present invention, it is necessary to incorporate one or more stabilizers into the plastic. A stabilizer is defined as a material that opposes oxidation or inhibits reactions promoted by oxygen or peroxides. Such stabilizers or antioxidants are used to protect the polymer against deterioration during processing of the polymer, storage of the polymer and during outdoor weathering of the polymer. Some types of antioxidants are effective in preventing deterioration of the polymer during processing but are not markedly effective in preventing actinic deterioration during outdoor weathering, whereas other types of antioxidants also known as ultraviolet stabilizers minimize actinic breakdown of the polymer during outdoor weathering but are not effective in preventing deterioration during fabrication of the polymer.

Several different classes of antioxidants are known, and we have found members of each class to be useful in the practice of the present invention. Known clases of antioxidants include alkylated phenols and bisphenols, alkylidene bis-, tris-, and polyphenols, thio- and dithio-, bis-, tris-, and polyalkylated phenols, phenol condensation products, amines, organic phosphates and phosphites, dithiocarbamates, thiazyl derivatives, thiuram disulfides, thiodipropionates, small particle-size low-pH carbon black, and benzophenones. Examples of representative individual antioxidants from some of the different classes are as follows:

1. thiodialkanoic acid esters of the following formula:

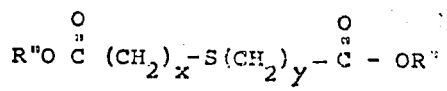

wherein R'' is an alkyl group, having about 4 to 20 carbon atoms, a cycloalkyl group, a hydroxy lower alkyl group or a polyalkylene oxide group and x or y is an integer from 1 to about 3. Diesters include butyl, amyl, hexyl, heptyl, octyl, nonyl, dodecyl, tridecyl, myristyl, pentadecyl, cetyl, heptadecyl, stearyl, lauryl, and eicosyl esters of 3,3'-thiodipropionic acid, thiodiacetate, thiodibutyrate and the like.

Specific compounds are:
Diheptylthiodipropionate
Dioctylthiodipropionate
Dimyristylthiodipropionate
Dilaurylthiodipropionate
Distearylthiodipropionate
Di-n-butylthiodipropionate
Diallylthiodipropionate
Bis(2-hydroxyethyl)thiodiproprionate
Dibutyl 4,4'-thiodibutyrate
Dioctyl 4,4'-thiodibutyrate
Dilauryl 4,4'-thiodibutyrate
Dipentadecyl 4,4'-thiodibutyrate
Dioctadecyl 4,4'-thiodibutyrate
Didecosanyl 4,4'-thiodibutyrate 2. Organo-phosphates and organo-phosphites represented by the following formulas:

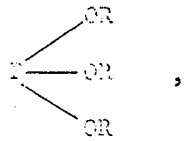 , 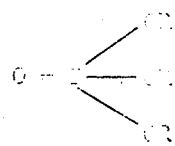

in which R is an alkyl or an aryl group, these groups being the same or different. Typical of such compounds are diphenyl-t-butyl phosphite, diphenyl heptyl phosphite, phenyl dioctyl phosphite, phenyl didecyl phosphite, diphenyl octyl phosphite, and the like; and diphenyl butyl phosphate, diphenyl amyl phosphate, phenyl dihexyl phosphate, diphenyl heptyl phosphate, phenyl dioctyl phosphate, diphenyl decyl phospate, triphenyl phosphite, tributyl phosphite, trioctyl phosphite, triphenyl phosphate, triamyl phosphate, tridecyl phosphate, triphenyl phosphite, triortho-tolyl phosphite, trixenyl phosphite, tri(paraphenoxy phenyl)phosphite, tri(para-chloro phenyl) phosphite, tri(ortho-octyl phenyl)phosphite. tri(nonylated phenyl)phosphite, tri(para-undecyl phenyl) phosphite, para-nonyl phenyl di(para-octyl phenyl)phosphite, mono-(ortho-secondary amyl phenyl)phosphite, mono(nonyl-phenyl) phosphite.

3. Alkylene-bis-alkyl substituted cresols of the general formula:

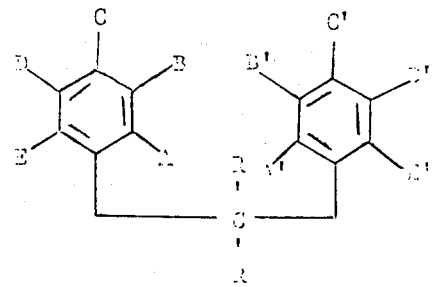

wherein one of the groups A, B, C, D and E is a hydroxyl group, two are hydrogen, one is a methyl and another is an alkyl group containing 1 to 10 carbon atoms, A', B', C', D' and E' are selected in the same manner, and R and R' are hydrogen or alkyl groups with not more than 9 carbon atoms in the sum of the R and R' groups. Typical examples are:
4,4'-methylene-bis(2,5-xylenol)
4,4'-ethylidene-bis-(6-ethyl-m-cresol)
4,4'-butylidene-bis-(6-t-butyl-m-cresol)
4,4'-decylidene-bis-(6-methyl-m-cresol)
4,4'-methylene-bis-(2-amyl-m-cresol)
4,4'-propylidene-bis-(5-hexyl-m-cresol)
3,3'-decylidene-bis-(5-ethyl-p-cresol)
2,2'-butylidene-bis-(3-n-hexyl-p-cresol)

4,4′-(2-butylidene)-bis-(6-t-butyl-m-cresol)
3,3′-4(decylidene)-bis-(5-ethyl-p-cresol)
(2,5-dimethyl-4-hydroxyphenyl) (2-hydroxy-3,5-dimethylphenyl) methane
(2-methyl-4-hydroxy-5-ethylphenyl) (2-ethyl-3-hydroxy-5-methylphenyl) methane
(3-methyl-5-hydroxy-6-t-butylphenyl) (2-hydroxy-4-methyl-5-decylphenyl)-n-butyl methane
(2-hydroxy-4-ethyl-5-methylphenyl) (2-decyl-3-hydroxy-4-methylphenyl)butylamylmethane
(3-ethyl-4-methyl-5-hydroxyphenyl)-(2,3-dimethyl-3-hydroxy-phenyl)nonylmethane
(3-methyl-2-hydroxy-6-ethylphenyl)-(2-isopropyl-3-hydroxy-5-methyl-phenyl)cyclohexylmethane
(2-methyl-4-hydroxy-5-methylphenyl) (2-hydroxy-3-methyl-5-ethylphenyl)dicyclohexyl methane; and the like.

4. Substituted phenols of the following general formulas:

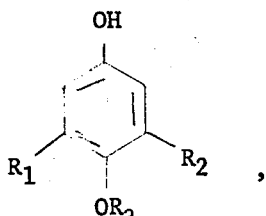
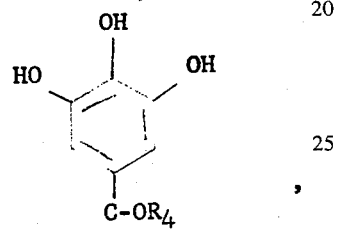

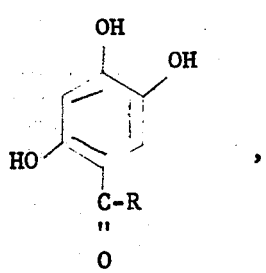
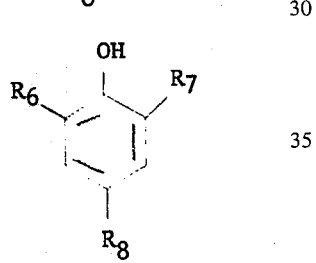

In the phenol formulas $R_3$, $R_4$ and $R_5$ are alkyl radicals desirably having 1 to about 18 carbon atoms and preferably 1 to about 12 carbon atoms. $R_1$, $R_2$ and $R_8$ are hydrogen atoms, alkyl radicals desirably having 1 to about 18 carbon atoms and preferably 1 to about 12 carbon atoms or cyclic hydrocarbon radicals desirably having 6 carbon atoms in the cyclic nucleus and preferably 1-alkyl-cyclohexyl radicals or 1-alkylbenzyl radicals with the alkyl radical having desirably 1 to about 18 and preferably 1 to about 12 carbon atoms. $R_6$ and $R_7$ are hydrogen atoms, alkyl radicals having generally 1 to about 40 carbon atoms, including 1 to about 18 carbon atoms and preferably 13 to about 18 carbon atoms or cyclic hydrocarbon radicals desirably having 6 carbon atoms in the cyclic nucleus and preferably 1-alkyl cyclohexyl radicals or 1-alkylbenzyl radicals with the alkyl radical having desirably 1 to about 18 and preferably 1 to about 12 carbon atoms. At least one of $R_1$ and $R_2$ is other than a hydrogen atom and at least two of $R_6$, $R_7$ and $R_8$ are other than hydrogen atoms. The substituent $R_2$ and at least one of $R_6$ and $R_7$ are preferably alkyl radicals, 1-methyl-benzyl radicals or 1-methylcyclohexyl radicals.

Typical substituted phenols are:
2-tert-butyl-4-methoxyphenol
3-tert-butyl-4-methoxyphenol
3-tert-octyl-4-methoxyphenol
2-methyl-4-methoxyphenol
2-stearyl-4-n-butoxyphenol
3-t-butyl-4-stearyloxyphenol
3-lauryl-4-ethoxyphenol
2,5-di-t-butyl-4-methoxyphenol
2-methyl-4-methoxyphenol
2-(1-methycyclohexyl)-4-methoxyphenol
2-t-butyl-4-dodecyloxyphenol
2-(1-methylbenzyl)-4-methoxyphenol
2-t-octyl-4-methoxyphenol
methyl gallate
n-propyl gallate
n-butyl gallate
lauryl gallate
myristyl gallate
stearyl gallate
2,4,5-trihydroxyacetophenone
2,4,5-trihydroxy-n-butyrophenone
2,4,5-trihydroxystearophenone
2,6-ditert-butyl-4-methylphenol
2,6-ditert-octyl-4-methylphenol
2,6-ditert-butyl-4-stearylphenol
2-methyl-4-methyl-6-tert-butylphenol
2,6-distearyl-4-methylphenol
2,6-dilauryl-4-methylphenol
2,6-di(n-octyl)-4-methylphenol
2,6-di(n-hexadecyl)-4-methylphenol
2,6-di(1-methylundecyl)-4-methylphenol
2,6-di(1-methylheptadecyl)-4-methylphenol
2,6-di(trimethylhexyl)-4-methylphenol
2,6-di(1,1,3,3-tetramethyloctyl)-4-methylphenol
2-n-dodecyl-6-tert butyl-4-methylphenol
2-n-dodecyl-6-(1-methylundecyl)-4-methylphenol
2-n-dodecyl-6-(1,1,3,3-tetramethyloctyl)-4-methylphenol
2-n-dodecyl-6-n-octadecyl-4-methylphenol
2-n-dodecyl-6-n-octyl-4-methylphenol
2-methyl-6-n-octadecyl-4-methylphenol
2-n-dodecyl-6-(1-methylheptadecyl)-4-methylphenol
2,6-di(1-methylbenzyl)-4-methylphenol
2,6-di(1-methylcyclohexyl)-4-methylphenol
2,6-(1-methylcyclohexyl)-4-methylphenol
2-(1-methylbenzyl)-4-methylphenol
and related substituted phenols.

5. Alkylene bisphenols of the general formulas:

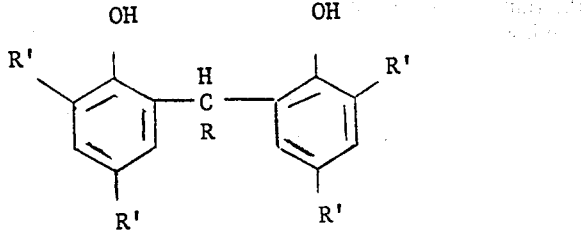

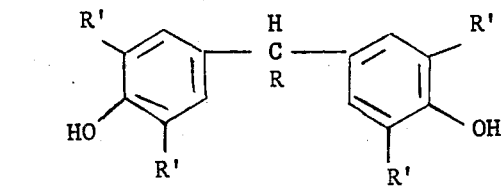

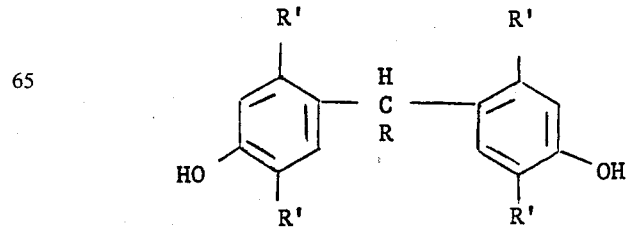

wherein R is methyl, ethyl or n-propyl and R' is an alkyl group. Examples of alkylene bisphenols are:

4,4'-butylidene bis(3-methyl-6-t-butyl phenol)
2,2-butylidene bis (4,6-dimethyl phenol)
2,2'-butylidene bis(4-methyl-6-t-butyl phenol)
2,2'-butylidene bis(4-t-butyl-6-methyl phenol)
2,2'-ethylidene bis(4-methyl-6-t-butylphenol)
2,2'-methylene bis(4,6-dimethyl phenol)
2,2'-methylene bis(4-methyl-6-t-butyl phenol)
2,2'-methylene bis(4-ethyl-6-t-butyl phenol)
4,4'-methylene bis(2,6-di-t-butyl phenol)
4,4'-methylene bis(2-methyl-6-t-butyl phenol)
4,4'-methylene bis(2,6-dimethyl phenol)
2,2'-methylene bis(4-t-butyl-6-phenyl phenol)
2,2'-dihydroxy-3,3',5,5'-tetramethylstilbene
2,2'-isopropylidene bis(4-methyl-6-t-butyl phenol)
methylene bis (beta-naphthol)
1,5-dihydroxy naphthalene
2,2'-ethylene bis (4-methyl-6-propyl phenol)
4,4'-methylene bis(2-propyl-6-t-butyl phenol)
4,4'-ethylene bis (2-methyl-6-propyl phenol)
2,2'-methylene bis(5-methyl-6-t-butyl phenol)
4,4'-butylidene bis(6-t-butyl-3-methyl phenol)

6. Alkylene trisphenols of the general formula:

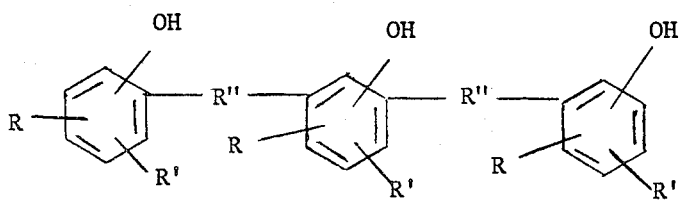

wherein R and R' are selected from the group consisting of hydrogen and lower alkyl groups (e.g., having up to five carbon atoms) and R'' is a lower alkylene group (e.g., having up to five carbon atoms). R and R', for example, may be hydrogen, methyl, ethyl, propyl, isopropyl, or tertiary butyl and R'' may be methylene, ethylene, propylene, ethylidene, butylidene. In one class R'' is an alkylene group having two bonds on the same carbon atom (alkylidene group) i.e., a methylene or alkyl-substituted methylene group.

Typical examples of trisphenols are:
2,6-bis (2'-hydroxy-3'-t-butyl-5'-methyl benzyl)-4-methyl phenol
2,6-bis (2'-hydroxy-3'-t-ethyl-5'-butyl benzyl)-4-methyl phenol
2,6-bis(2'-hydroxy-3'-t-butyl-5'-propyl benzyl)-4-methyl phenol 7. Antioxidants useful as light stabilizers are cinnamonitriles having the formula:

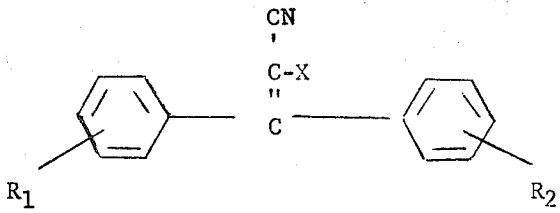

wherein $R_1$ and $R_2$ are groups selected from the class consisting of alkyl groups of 1–4 carbon atoms, alkoxy groups of 1–12 carbon atoms, cyclohexyl, hydrogen and chlorine and X is a group selected from the class consisting of cyano, carboalkoxy groups of 1 to 4 carbon atoms, carboxamide, carboxamides substituted with at least one alkyl group of 1 to 4 carbon atoms and carboxamides substituted with a phenyl group. For example:
alpha-carbomethoxy, beta-phenyl cinnamonitrile;
alpha-carboethoxy, beta-phenyl cinnamonitrile.

8. Phenyl salicylates having the formula:

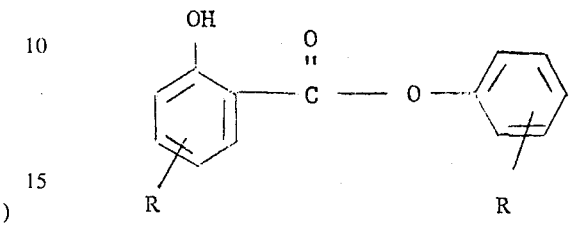

wherein each R is independently hydrogen or an alkyl radical having 1–22 carbon atoms. Examples are:
phenyl salicylate
p-tert-butylphenylsalicylate
octylphenylsalicylate
(1,1,3,3-tetramethylbutyl)phenylsalicylate
nonylphenylsalicylate
dodecylphenylsalicylate
octadecylphenylsalicylate
(1-methylheptadecyl)phenylsalicylate
t-butylphenyl 5-t-butylsalicylate
t-octaphenyl-5-t-butylsalicylate
dodecylphenyl 5-t-butylsalicylate
octadecylphenyl-5-t-butylsalicylate
octylphenyl 5-t-octylsalicylate
octylphenyl 5-dodecylsalicylate
octadecylphenyl 5-t-octylsalicylate
octadecylhexyl 5-octadecylsalicylate
(n-methylheptadecyl)phenyl 5-(1-methylheptadecyl)-salicylate
o,o'-dimethylphenylsalicylate
o,o'-dimethylphenyl 5-t-butylsalicylate
o,p-dimethylphenyl 5-t-butylsalicylate
o,o'-bis(octadecyl) phenylsalicylate
o,p-bis(octadecyl) phenylsalicylate
2,2'-dihydroxy-4,4'-dimethoxybenzophenone
2-hydroxy-4-methoxy-4'-chlorobenzophenone
2,2'-dihydroxy-4-methoxybenzophenone
2-hydroxy-4-methoxybenzophenone
2,2'-dihydroxy-4-methoxy-ethoxy benzophenone 10. Primary polyamines, such as p,p'-diaminodiphenyl-methane (formaldehyde aniline), diarylamines, such as N-phenyl-α-naphthylamine, bis-diarylamines such as N,N'-diphenyl-p-phenylene-diamine, mixtures containing diarylamines, modified bisdiarylamines such as N-cyclohexyl-N'-phenyl p-phenylenediamine, alkylated diarylamines, e.g., monooctyl - and dioctyldiphenylamine mixtures, mixtures containing alkylated diarylamines, ketone-diarylamine condensation products such as diphenylamine-acetone condensation products, dihydroquinolines, such as 1,2-dihydro-2,2,4-trimethyl-6-phenyl-quinoline, mixtures of dihydroquinolines and diarylamines, aldehyde-amine condensation products, such as aldol-α-naphthylamine condensation products, alkylarylamines such as N,N'-diphenyl-ethylenediamine, and aldehyde imines.

The types of antioxidants listed above are generally intended to protect against thermal degradation during processing, but are also useful in retarding actinic degradation of polymers. Antioxidants usually designated as ultraviolet stabilizers, i.e., specifically useful in retarding actinic degradation of polymers, include nickel organic compounds such as nickel bisoctyl phenyl sulfide, benzotriazoles such as substituted hydroxyphenyl benzotriazole and benzophenones such as 2-hydroxy-4-n-octoxybenzophenone, benzylidene malonates such as p-methoxybenzylidene malonic acid, salicylates such as p-octylphenyl salicylate, substituted acrylonitriles such as ethyl-2-cyano-3,3-diphenyl acrylate, monobenzoates such as resorcinol monobenzoate and other compounds such as beta-benzoyloxy-2'-hydroxy-chalcone.

Inorganic pigments may also be used to retard actinic degradation of polymers. The inorganic pigments include titanium dioxide, zinc oxide, silica, aluminum silicate and acidic carbon black.

The antioxidant system used within the scope of the present invention can vary within very wide limits and will depend upon the stabilizing strength of the antioxidant system, the heat history of the polymer, the amount of solar radiation needed to degrade the film, and the ambient temperatures to which the film will be exposed and the types and amounts of other additives used. The other possible additives include filler, inorganic pigments, and other polymers, and for agricultural applications can include fertilizer, herbicides, insecticides and fungicides.

By "antioxidant system" we mean the specific antioxidants or stabilizers and their amounts incorporated in the polymer. The antioxidant system may be added to the polymer by dry blending, by dispersion, by solution in a suitable solvent, or by dissolving the polymer and antioxidant in a suitable solvent.

POLYMER

The polymer used in this invention may be homopolymer of butene-1, or it may be a co- or higher polymer of predominantly butene-1 with other copolymerizable olefinically unsaturated monomers, such as ethylene, propylene, methyl-pentene, $C_6$–$C_{20}$ alpha olefins, styrene, butadiene, isoprene, and the like. Further mixtures of butene-1 homopolymer with homo- or copolymers of other monomers are suitable, or graft or block copolymers of these monomers may be used. Still further, polyolefins may be blended in quantities up to 50% with polybutene-1 for specific applications. Whether present as a blend or copolymer, the content of butene-1 should be at least about 50% by weight of total monomer, advantageously at least about 60% and preferably at least about 75%.

The polymer of butene-1 may have a molecular weight of about 10,000 to 3,000,000; preferably about 40,000 to 1,500,000. The polymer preferably is over 50% isotactic and preferably over 70% isotactic as measured by diethyl ether extraction. The polymer preferably has a melt index between 0.05 and about 60, more preferably between about 0.1 and 20 (ASTM D-1238-65T; 190°C, 2160 g).

THERMAL HISTORY

The thermal history of the article will influence the amount of solar radiation required to degrade the film. The thermal history of the article is determined by the processing temperatures during preparation of the rod and pellets and during forming of the article, by the number of times the polymer has been extruded forming the article, and by the amount of oxidation to which the polymer has been subjected prior to completion of manufacturing the article. The specific thermal conditions of forming polymer rods, pellets and, ultimately, extrusions or injections can be tailored so that, with allowance made for the special additives, the final products will have the desired characteristics of degradation.

Thus, while polybutene has heretofore been proposed as an agricultural mmulch film it has not been identified as to constitution or thermal history. Moreover, most polybutene films will not be suited for the instant purposes in that their stability will be too great, i.e. they will not degrade, even if the polymer employed were identical with that of the present invention. This is due to the following reason: because of their thermal properties and uncontrollable instabilities, polyethylene and polypropylene when formed into film require the presence of stabilizers and antioxidants. This is so well known that even when descriptions as to working polypropylene, for example, make no reference to stabilizers, everyone skilled in the art is aware that a relatively high proportion of stabilizer must be present, especially for producing shaped objects by processes which require much heat. For this reason many commercial polypropylene resins already contain the stabilizers, partially for the purpose of carrying the polymer from raw resin through the melting, extrusion of strands and cutting into the pellet form which is commercial, but primarily to make subsequent processing possible without uncontrolled degradation; where the pellets do not contain stabilizer and the user intends extrusion or molding, he would add stabilizers along with pigments and other substances prior to extrusion.

In extending this conventional practice to butene polymers, the use of the conventional amount of polyolefin stabilizers to make films or containers from conventional polybutene by conventional processing results in products with high stability. Even if there is employed polybutene of high molecular weight and isotacticity, of the type which is less stable to the atmosphere, the normal amount of stabilizers would be utilized even if unmentioned (due to presence in the purchased polymer per se or addition by the film maker) and the resulting product would be of very high stability, i.e. over 100,000 TALU (hereinafter explained) and frequently much higher. Thus, with ideal films of stabilities at the low end of this range it would be possible to achieve degradation within a single growing season if the temperature is extremely high and there is unobstructed sunlight for long periods of time, i.e. in the tropics. In other environments degradation would be too slow.

While reducing the amount of stabilizer was initially considered, the idea was discarded because as with polypropylene, we thought relatively high levels were needed to permit shaping of polybutene without uncontrollable degradation, which in fact occurs with some butene polymers. With our preferred polymers, however, experimentation surprisingly indicated shaping was possible without the normal amounts of stabilizers needed for other polyolefins and yet the product would not degrade uncontrollably during shaping or in later use.

Consequently, in accordance with one aspect of our invention it is possible to achieve the desired levels of relatively rapid controlled degradability of polybutene by using little if any stabilizers during the polybutene shaping, e.g. less than 1%, generally less than 0.5% and even less than 0.2% under ideal extrusion conditions, i.e. minimum degradation. In accordance, with another aspect of the invention, as noted hereinabove, the requisite degradability can be achieved by tailoring the thermal history of the polymer even at higher, i.e. normal, levels of stabilizer. In practice, where stabilizers are normally present in the commercial polybutene resin the thermal history will be tailored to the particular stabilizer and its content so that as a result of the interaction of these parameters the product will have the desired short term stability, i.e. less than about 70,000 TALU.

TEST PROCEDURE FOR MEASUREMENT OF EXPOSURE AND DEGRADATION

As part of the practice of the present invention, the following test procedures and method of calculation have been devised to permit the degradation rates of the degradable plastic products to be predicted.

Exposure samples of the degradable plastic article, for example - a packaging film, were cut from the article by preferably placing a suitably shaped die cutter over the film, a trapezoidal block of wood over the die cutter, and striking the block of wood with a rubber or wooden mallet to give strips having a width of 0.5 inch and a length of 5.0 inches. Other cutting devices such as given in ASTM procedure D-882-64T may also be used but a die cutter is preferred.

A wooden frame to hold the sample strips was constructed from two pairs of 36-inch lengths of parting beads, each ½ × ¾ inches in section. Two pieces of the parting beads were laid parallel 5 inches apart with the ¾ inch sides flat, and the ends were joined by nailing to 2 inch × 5 inch piece of ¼ inch thick plywood. The resulting frame was 36 inches long and 5 inches wide. Holes were drilled through each of the ¾ inch sides of each of the four parting beads, at a distance of 12 inches from each end. Double-backed pressure sensitive tape was placed on the ¾ inch side of the sides of the frame. The exposure sample strips were than placed on the double-backed tape perpendicular to the length of the tape. The sample thickness was measured at five different places as each sample strip was placed on the tape using a micrometer which had a vernier scale to measure the sample thickness accurately to 0.1 mil. After all the sample strips had been placed on the double-backed tape, the other two 36-inch lengths of parting bead were placed over the ends of the film strips, bolts were placed through the holes and the parting bead strips were clamped together using four bolts and wing nuts.

Nails were hammered into one of two 2 × 4-inch planks about 7 inches apart and the wooden frame holding the exposure sample strips was placed on the 2 × 4-inch planks, so that the frame holding the samples did not touch the roof and a hole in the small frame was placed over the nail in the 2 × 4-inch frame.

The conditions of the sample strips were observed each week, and any splits or breaks in the samples were noted. After specified periods of time, five strips were removed from the frame by cutting or tearing the strip at the point where the strip was held by the parting beads.

During the exposure period, the amount of solar radiation to which the sample strips were exposed was measured by means of a suitable instrument capable of continuously recording radiation intensity in units which can be integrated to give Langley units (gram calories per square centimeter). A suitable instrument is the seven-day Pyrheliograph, manufactured by the Belfort Instrument Company, Baltimore, Md. The instrument was placed adjacent to the samples tested.

The total amount of radiation in Langley units was obtained by measuring the area under the instrument chart trace, using a polar planimeter.

During the exposure period, the mean daily maximum temperature for the month of the test was obtained from a nearby weather station. For a more accurate measurement of the temperature effect, a record is made each day of the maximum outside temperature.

The tensile properties of the sample strips were measured by the following procedure based on a modification of the ASTM test method D-882-64T, using "Method A" of this reference, i.e., static weighing and constant rate of grip separation.

The test instrument grips used to hold the sample were lined with thin rubber pads. The jaws were then adjusted to that the distance between them was 1.00 inch. The distance of separation between the grips during the tensile test was recorded on a recorder and was also obtained by a ruler graduated in tenths of an inch held behind the specimen. The distance between the jaws at the time of break was estimated on the ruler to the nearest 0.01 in.

The thickness of the sample was measured by a micrometer with a vernier scale to the nearest 0.01 mil and recorded to the nearest 0.1 mil. Three measurements of the sample thickness were taken while the film was gripped tightly by the upper grip and loosely by the lower grip. After the sample thickness had been measured, the lower grip was tightened. When the sample was fragile, its thickness was measured in the central area of the strip prior to placement in the machine, and the film was tightened first in the top grip and then in the lower grip so as not to tear the film.

For maximum accuracy, the most sensitive load scale was used for which the breaking load would remain on scale. The tensile strength was calculated as load at break per inch of sample width per mil of sample thickness. The elongation at break was calculated by the usual method.

The jaw separation speed was based on the elongation of the film when the elongation of the film was known approximately prior to the test, otherwise rate of grip separation was 10 inches per minute. After two specimens had been tested the rate of grip separation was generally decreased to 0.5 in/min if the elongation at break was less than 100%. If the elongation at break was less than 20%, then the rate of grip separation was generally decreased to 0.2 in/min.

When the elongation at break was known to be less than 100% then the rate of grip separation for the initial two specimens was generally 0.5 in/min.

CRITERIA OF DEGRADATION

As employed herein, complete degradation of a plastic article occurs when the elongation at break is about 10% or less and at the same time the tensile strength is about 1.4 lb/in-mil or less.

When the plastic has tensile properties equal to or lower than these respective values, it is very brittle, and readily disintegrates under the action of forces such as wind, rain, or mechanical equipment, forming small particles which can readily be consumed by microorganisms such as are present in the soil.

CALCULATION OF EXTENT OF EXPOSURE TO SOLAR RADIATION

In accordance with one aspect of the present invention, it was discovered that a particular sample of a degradable plastic article prepared according to the method of the present invention and comprising at least about 50% of butene-1 required a greater number of Langley units to degrade when exposed in the fall than in the summer, thus demonstrating the Langley units alone as a measure of exposure to solar radiation are inadequate in predicting the degradability of a particular degradable plastic article of the present invention, when the article is exposed at different seasons of the year.

To deal with this discovery, the following method of calculating exposure was devised, resulting in predictability of degradation rate essentially independent of season or geographic location over extremely wide ranges. A temperature correction factor E is calculated for successive increments of the exposure period, preferably weekly to monthly intervals, by first measuring the mean maximum daily temperature for each short increment of the exposure period, and then obtaining E from the approximate formulas:

$$E = 10^{54.39} (459.7 + T_F)^{-19.88} \text{ or } 10^{49.32} (273.2 + T_C)^{-19.88}$$

where $T_F$ or $T_C$ is the mean daily maximum temperature in degrees Fahrenheit or degrees Centigrade, respectively.

The temperature-adjusted Langley unit (TALU), which is defined as the thermally corrected measure of extent of exposure to solar radiation for the purpose of practicing this invention with butene-1 polymer is then given by the formula $$\text{Temperature-Adjusted Langley Units} = \frac{1}{E} \times \text{Measured Langley Unit}.$$

Finally, total extent of exposure is calculated as the summation of temperature-adjusted Langley units determined for each successive short increment of the exposure period.

Thus a particular degradable plastic article requires approximately the same number of temperature-adjusted Langley units to degrade completely whether exposed in Maine or Florida, in summer or in fall.

The following is a table of temperature correction factors corresponding to various mean daily maximum temperatures:

| Mean Daily Maximum Temp. °F | Temperature Correction Factor E |
| --- | --- |
| 30 | 8.47 |
| 40 | 5.66 |
| 50 | 3.82 |
| 60 | 2.60 |
| 70 | 1.78 |
| 80 | 1.228 |
| 90 | 0.851 |
| 100 | 0.594 |
| 110 | 0.418 |
| 120 | 0.338 |

It has been found that in a year in northeast United States, an exposed article will receive about 90,000 TALU, the amount in each month ranging from about a few hundred to 15,000. To make articles which will degrade in a reasonable time anywhere in the United States, therefore, the stability of the article should be no more than about 70,000. At the other end, if the stability is too low, it will be difficult to fabricate and it may unintentionally degrade during normal storage. Consequently, the stability should be at least about 5,000 TALU, which will account for articles which may be left exposed on store shelves or in homes for some time. Containers which are intended to degrade when discarded as litter or garbage, desirably should have a stability less than about 30,000 TALU.

Films such as agricultural mulch films must also have a stability of at least about 5,000 TALU to serve at all as a mulch. At the other end, they should degrade before time for cultivating the soil for another crop, i.e. they should degrade in less than a growing season which extends from about the time of planting to the next cultivation. In this manner, it is not necessary to remove the film or even to plow it under in a separate pass.

For certain crops a high stability of about 25,000 to 70,000 TALU is desirable, so as to exclude weeds for a long time. For other crops having a short growing season a stability of 5,000 to 15,000 is desirable. Moreover, the polymer may be compounded so that the film will contain a chemical soil treating agent such as fertilizer, herbicide, pesticide, or the like, which upon degradation of the film will be released to serve its function. Thus, a growing area can be covered with a mulch which will effect the desired protection for the necessary time, e.g. until the seeds have produced plants which are hardy and large enough to block out weeds themselves, after which the film will degrade and release the chemical needed by the growing plants, e.g. fertilizer, pesticide, or the like.

Such mulch films may be used to overlay the point of planting and/or they may be located between planting rows so as to release chemicals at such locations upon decomposition. In another use, the field may be pretreated with volatile or degradation-prone chemicals and by thereafter laying down the film, and covering its edges longitudinally with soil to hold the film down, the chemicals will be shielded against loss due to evaporation or degradation due to exposure.

In other embodiments, polybutene film can be laminated in part or in total to natural or black Kraft paper, to aluminum foil or to polybutene film compounded with fillers such as pigments, insecticides, pesticides or fertilizers, to obtain specific effects, such as stripes of aluminum foil paper, filled polybutene and the like. It has been discovered that the reflective character imparted to the film by aluminum foil provides lower soil temperatures, decreases virus disease, and serves to control certain insects such as aphids when used with crops such as summer planted squash or lettuce. After the growing season, the laminated film will degrade in the manner described.

The invention will be further illustrated in the following examples wherein all parts are by weight unless otherwise expressed.

EXAMPLE 1

Polybutene resin (400 grams) with a melt index of 0.5 by ASTMD 1238-65T (190°C. 2160 gram load) about 92% isotactic, with an ether insoluble of 92% and stabilized with 0.2% tris(mixed mono- and dinonyl phenyl) phosphite and 0.2% dilaurylthiodipropionate was mixed using a Waring Blendor with 1.2 grams of ultraviolet stabilizer 2(3',5'-di-tertiary-butyl-2-hydroxyphenyl)-5-chlorobenzotriazole in 900 cc acetone. The slurry was transferred to a 4-liter beaker and the acetone was allowed to evaporate off overnight at room temperature. The polymer was dried in a vacuum oven at about 30°C. The stabilized polybutene was extruded in a 1-inch Killion extruder at a temperature of about 425°F through a rod die and pulled through a water trough by a chill roll to obtain rod of about ¼-inch diamter. The rod was cut into lengths of about 12 inches and ground in a Dreher Grinder to obtain pellets. The stabilized polybutene pellets were extruded in a one-inch Killion extruder at an extrusion temperature of about 220°C and an extruder screw speed of about 20 rpm. The film extrudate was dropped onto a chill roll which was cooled to about 0°C by pumping precooled ethylene glycol through the jacket of the chill roll. Polybutene film having a thickness of about two mils and a width of about four inches was obtained.

Sixty strips of film each 0.5 × 5 inches were cut from the extruded film by a die cutter. The strips were exposed on May 28 according to the test method described above.

The amount of solar radiation to which the film strips were exposed was measured daily by a 7-day Belfort Pyrheliograph. The total radiation in Langley units, gram calories per square centimeter, was measured from a weekly chart by integration of the area under the inked record using a polar planimeter.

During the outdoor exposure period, the condition of the films was noted with respect to the number of broken and/or split strips. After each period of exposure, five strips of film were removed from the frame without disassembling the frame. These times of exposure were 2, 3, 4, 5, 6, 8, 10 and 12 weeks. The tensile strength and elongation of the films were measured by an Instron machine, holding the film with rubber coated grips. The film thickness was measured after the film was placed in the grips when the film was tough. When the film was brittle, the film thickness was obtained prior to assembling the film in the grips. The tensile strength and elongation of the film were measured as in the procedure described above.

The films were exposed in May to 2170 Langley units of solar radiation at an average ambient maximum temperature of 23.3°C, in June to 14,000 Langley units at an average ambient maximum temperature of 27.2°C, in July to 11,520 Langley units at an average ambient maximum temperature of 27.8°C, in August to 14,850 Langley units at an average ambient maximum temperature of 28.9°C, and in September to 720 Langley units (LU) at an average ambient maximum temperature of 24.4°C. After this period (12 weeks), exposure to a total of 36,600 LU or 31,900 TALU of solar radiation, the film had degraded completely as evidenced by a tensile strength of 1.0 lb/in-mil and an elongation of 10%.

EXAMPLE 2

A sample of the polybutene resin of Example 1 was extruded into film about 2 mils thick, using a conventional laboratory extruder.

Samples were exposed at Princeton, N.J. starting on May 28 and September 8, respectively. Elongations and exposure in both Langley units (LU) and temperature-adjusted Langley units (TALU) were measured according to the test procedures described above.

After five weeks the sample exposed beginning May 28th partially degraded from an initial 314% elongation to 50% elongation, requiring 13,600 temperature-adjusted Langley units. However, 11 weeks corresponding to 12,200 temperature-adjusted Langley units were required to partially degrade the sample exposed beginning September 8 to the same elongation of 50%. Exposures in uncorrected Langley units were 16,500 and 23,200, respectively, as indicated in Table I.

TABLE I

EXAMPLE 2
Exposure to
50% Elongation

| Starting date of test | Langley units | Temperature-Adjusted Langley Units | Exposure Period to 50% Elongation |
|---|---|---|---|
| May 28 | 16,500 | 13,600 | 5 weeks |
| September 8 | 23,200 | 12,200 | 11 weeks |

Thus the data clearly illustrate that temperature-adjusted Langley units provide a much more accurate measure of extent of exposure for purposes of predicting degradation rate, than do uncorrected Langley units.

EXAMPLE 3

Polybutene film was prepared similarly to Example 2, except that the antioxidant system was 0.02% tri(-nonylated phenyl)phosphite and 0.2% dilaurylthiodipropionate, and the resin was rodded once prior to extrusion into film. Starting dates for exposure at Princeton, New Jersey were August 4th and September 8th, respectively for two samples.

The samples required 3 and 5 weeks, respectively, to degrade completely, i.e. to 10% elongation and 1.4 lb/in-mil tensile strength, as indicated in Table II.

TABLE II

EXAMPLE 3
Exposure to
Degradation

| Starting date of test | Langley Units | Temperature-Adjusted Langley Units | Exposure Period to Degradation |
|---|---|---|---|
| August 4 | 8,500 | 9,700 | 3 weeks |
| September 8 | 13,600 | 8,300 | 5 weeks |

In order to predict the degradation period necessary for a specific degradable plastic article to take place at a particular geographic location and to be exposed starting at a given date, it is first necessary to establish the number of TALU for degradation in an exposure test conducted at any convenient location and starting at any convenient time of year, using the test method described above. Use is then made of statistical meteorological data published by various Weather Bureaus, in the form of monthly mean daily solar radiation in LU and monthly mean daily maximum termperatures for past years, for the location and time of year forwhich it is desired to predict the degradation rate. TALU valves are then claculated for varying periods of exposure, and the predicted degradation period is the degradation period selected as that corresponding to the TALU value calculated from the measurements in the test experiment. Such calculations are easily performed with the aid of modern high-speed computers.

The accuracy of the prediction of the degradation period is determined by whether or not the weather during the degradation period is unseasonably warm, cool, sunny, or overcast. If the weather is average for the location and time of year under consideration, it has been under when the earlier-than-usual harvesting has been completed.

EXAMPLES 4 THROUGH 18a

Polybutene films approximately 2 mils thick were prepared according to the method of Example 2, except that different antioxidant systems were incorporated into the polymer. Samples of each of the different compositions were exposed to solar radiation according to the test method described above, and allowed to degrade completely, i.e., to an elongation <10% and a tensile strength <1.4 lb/in-mil.

The number of TALU necessary for complete degradation were measured for each antioxidant system, and are listed in Table III. These examples illustrate the wide range of degradabilities readily obtainable for 2-mil thick polybutene films, by varying the antioxidant system: from 6,200 TALU in essentially antioxidant-free Example 4, to greater than 26,000 TALU in Example 10 which contained 0.2% dilaurylthiodipropionate, 0.2% tri(nonylated phenyl)phosphite, and 0.3% 2-hydroxy-4-n-octoxybenzophenone. Example 4 would be predicted to degrade in central Maine in less than Table III Degradabilities of Polybutene Films Containing Various Antioxidant Systems

| Example No. | Antioxidant System[(a)]% | | | | | | | | | | | | | Exposure to Degradation, Temp.-Adjusted Langley Units gCal/cm$^2$ × 10$^{-3}$ |
|---|---|---|---|---|---|---|---|---|---|---|---|---|---|---|
| | (1) | (2) | (3) | (4) | (5) | (6) | (7) | (8) | (9) | (10) | (11) | (12) | (13) | |
| 4 | | | | | | | | | | | | | 0.02 | 7.4 |
| 5 | 0.05 | | | | | | | | | | | | | 9.4 |
| 6 | | 0.02 | | | | | | | | | | | | 7.4 |
| 7 | | | 0.02 | | | | | | | | | | | 8.3 |
| 8 | | 0.2 | | 0.02 | | | | | | | | | | 15.8 |
| 9 | | 0.2 | | 0.2 | | | | | | | | | | 21.5 |
| 10 | | 0.2 | | 0.2 | 0.3 | | | | | | | | | 26.0 |
| 11 | | 0.2 | | 0.02 | | 0.2 | 0.3 | | | | | | | 13.9 |
| 12 | | 0.2 | | 0.02 | | | | 0.2 | 0.3 | | | | | 21.3 |
| 13 | | 0.2 | | 0.02 | | | | | | 0.2 | | | | 19.5 |
| 14 | | 0.2 | | 0.02 | | | | 0.2 | | | | | | 12.9 |
| 15 | | 0.2 | | 0.02 | | | | | | | 0.3 | | | 12.9 |
| 16 | 0.2 | 0.2 | | 0.02 | 0.3 | | | | | | | | | 26.0 |
| 17 | | 0.2 | | 0.02 | | | 0.3 | | | | | 0.2 | | 21.3 |
| 18 | | 0.2 | | 0.02 | | | 0.1 | | | | | | | 31.9 |
| 18a | | (none) | | | | | | | | | | | | 6.2 |

Note (a)
(1) octadecyl-3,5-di-t-butyl-4-hydroxycinnamate
(2) dilaurylthiodipropionate
(3) 1,3,5-trimethyl-2,4,6-tris[3,5-di-t-butyl-4-hydroxbenzyl]benzene
(4) tri(nonylated phenyl)phosphite
(5) 2-hydroxy-4-n-octoxybenzophenone
(6) 1,1'-thiobis(2-naphthol)
(7) 2(3,5'-di-t-butyl-2-hydroxyphenyl)-5-chlorobenzotriazole
(8) tetrabis[methylene-3,5-di-t-butyl-4-hydroxycinnamate]methane
(9) 2,2'-thiobis(4-t-octylphenolato)m-butylamine nickel II
(10) hindered phenol
(11) 2-(2'-hydroxy-5'-methylphenyl)benzotriazole
(12) 2,2'-methylene bis (4-methyl-6-t-butylphenol)
(13) 2,6-di tert.-butyl-4-methylphenol found that the prediction is very accurate. Thus according to the law of averages, a farmer using agricultural mulch film, for example, which is predictably degradable according to the method of the present invention, will obtain very accurately predicted degradation rates far more often than not. Moreover, the degradation rate will be keyed to the maturation rate so that if warmer weather and/or more sunshine are encountered so that the crops mature faster, the mulch film will degrade more rapidly and be in condition for plowing one month outdoors starting in May, while Example 17 would takeover 2½ months to degrade outdoors in San Antonio, Tex., starting in early February.

EXAMPLE 19

A polybutene film was prepared similarly to Example 3, incorporating the same antioxidant system; however, instead of rodding the resin prior to extrusion into film, the rodding step was omitted. The extent of exposure of the film to degradation was found to be 15,800 TALU, as opposed to 8,300 or 9,700 TALU in Example 3, thus demonstrating that the thermal history during processing of the degradable polymer can materially affect its degradability. Thus, varying the extent of processing can be used in addition to varying the antioxidant system as a practical method of obtaining polymers of controlled degradability, within the scope of the present invention.

EXAMPLE 20

400 grams of the polybutene resin of Example 1 was swollen in about 2200 cc of carbon tetrachloride to obtain a viscous jelly. The swollen polymer was added to methanol to precipitate the polymer using a Waring Blendor. The polymer was washed twice with methanol using a Waring Blendor. The polymer was dried at about 30°C under vacuum. The polymer was considered to be essentially free of stabilizer.

The essentially stabilizer-free polybutene (360 grams) was mixed using a Waring Blendor with a solution of 0.072 gram of 1,3,5-trimethyl-2,4,6-tris-(3,5-di-t-butyl-4-hydroxybenzyl) benzene in 700 cc acetone. The slurry was transferred to a 4-liter beaker and the acetone was allowed to evaporate off overnight at room temperature. The polymer was dried in a vacuum oven at 30°C. The stabilized polymer was extruded in a 1-inch Killion extruder at an extrusion temperature of about 220°C through a rod die. The rod was cut into strips and the strips were ground into pellets. The pellets were extruded in a 1-inch Killion extruder at an extrusion temperature of about 205°C onto a prechilled chill roll using chilled ethylene glycol to cool the chill roll. The temperature of the chilled ethylene glycol was about 4°C. Polybutene film with a thickness of about 2 mils was obtained.

The outdoor stability of the film was measured by the procedure given in Example 19. Twenty strips of the film were placed in a wooden frame and the frame was placed on the roof on April 6. The film degraded completely by May 20 after exposure to 10,210 Langley units at an average ambient maximum temperature of 15.8°C plus 11,680 Langley units at an average ambient maximum temperature of 22.6°C. This total extent of exposure corresponds to 8,660 TALU.

After exposure to only 6,750 TALU, the elongation was 10%, and the tensile strength was 1.5 lb/in-mil.

EXAMPLE 21

The essentially stabilizer-free polybutene made in Example 20 was extruded into ¼-inch rod at about 190°C. The rod was ground into pellets and the pellets were extruded through a film die at an extrusion temperature of 220°C onto a prechilled chill roll using ethylene glycol at a temperature of about 0°C as the coolant. The extruded film was light brown, indicating that the film had degraded slightly during extrusion because the polymer did not contain sufficient antioxidant.

The outdoor stability of the film was measured by the procedure given in Example 1, starting on August 4. The film degraded in two weeks of exposure to 6,500 Langley units (6,200 TALU) of solar radiation at an average daily maximum temperature of 28.9°C as evidenced by a tensile strength of 0.6 lb/in-mil and an elongation of 10%.

EXAMPLE 22

The procedure of Example 1 was repeated except that low density polyethylene stabilized with only 0.001% of butylated hydroxy toluene was used. The polyethylene was extruded through a film die at an extrusion temperature of 235°C onto a chill roll. The outdoor stability of the extruded film was determined by the procedure given in Example 1, starting on August 4. The polymer did not degrade after exposure in 18 weeks to 41,560 Langley units of solar radiation as evidenced by a final tensile strength of 1.6 lb/in-mil and an elongation of 280%. Maximum temperature and Langley units are:

|  | Maximum Temp., °C | LU | TALU |
|---|---|---|---|
| August | 28.9 | 13,240 | 12,570 |
| September | 24.4 | 11,040 | 7,730 |
| October | 18.3 | 9,630 | 4,450 |
| November | 11.1 | 6,070 | 1,710 |
| December | 3.9 | 1,560 | 270 |
| Total |  | 41,560 | 26,730 |

EXAMPLE 23

The procedure of Example 1 was repeated except that 1.0% of finely divided, channel-type carbon black was substituted for the ultraviolet stabilizer. 400 grams of the same polybutene resin as in Example 1 was dry blended with 4.0 grams of a finely divided channel type carbon black. The dry blend was extruded in a one-inch Killion extruder at an extruder temperature of about 205°C through a rod die and pulled through a water trough by a chill roll to obtain ⅛-inch diameter rod. The rod was cut into about 18-inch lengths, ground into pellets. The pellets were extruded through a film die at about 215°C and the film extrudate was dropped onto a chill roll cooled with ethylene glycol at about 5°C. Film with a thickness of about 2.0 mils was obtained.

The outdoor stability of the film was determined by the procedure given in Example 19. Fifty strips of the film were placed in a wooden frame and the frame was placed on the roof on July 7. After exposure in July to 8,510 Langley units at an average ambient maximum temperature of 27.8°C, to 14,850 Langley units at an average ambient maximum temperature of 28.9°C in August, to 11,040 Langley units at an average maximum temperature of 24.4°C in September, and to 4,530 Langley units at an average maximum temperature of 18.3°C in October, the film retained toughness as evidenced by a tensile strength of 0.8 lb/in-mil and an elongation of 19%. Total number of adjusted Langley units is 31,420 units.

Control polybutene films without any carbon black completely degraded after exposure to 8,510 Langley units at an average maximum temperature of 27.8°C, 14,850 Langley units at an average maximum temperature of 28.9°C, and to 800 Langley units at an average maximum temperature of 24.4°C, as evidenced by a tensile strength of 1.2 lb/in-mil and an elongation of 8%. The corresponding total number of adjusted Langley units is 22,160 units.

EXAMPLE 24

The procedure of Example 23 was repeated except polybutene stabilized with 0.02% tri(nonylated phenyl)phosphite and 0.2% dilaurylthiodipropionate was used as the base polymer. Polybutene film containing 1.0% channel type carbon black was made by the procedure given in Example 23, and the outdoor stability was obtained by the procedure given in Example 19. Fifty strips of the film were placed in a wooden frame and the frame was placed outside on July 7. After exposure to 8,500 Langley units at an average ambient maximum temperature of 27.8°C, to 14,850 Langley units at an average ambient temperature of 28.9°C, to 11,040 Langley units at an average maximum temperature of 24.4°C, and to 4,530 Langley units at an average maximum temperature of 18.3°C, the film retained toughness as evidenced by a tensile strength of 1.0 lb/in-mil and an elongation of 19%. The corresponding total number of adjusted Langley units is 31,420.

Control polybutene film without any carbon black degraded after six weeks of exposure to 8,510 Langley units at an average maximum temperature of 27.8°C and to 8,510 Langley units at an average maximum temperature of 28.9°C as judged by a tensile strength of less than 0.2 lb/in-mil and an elongation of 10%. Corresponding TALU were 15,570.

EXAMPLE 25

Polybutene with a melt index of 0.5 about 90 % isotactic and stabilized with 0.02% tri(nonylated phenyl)phosphite and 0.2% dilaurylthiodipropionate was extruded at about 205°C through a rod die to obtain rod of about ¼-inch diameter. The rod was cut into 18-inch lengths and ground into pellets. The pellets were fed to the 1-inch extruder and extruded at 220°C onto a prechilled chill roll using ethylene glycol at 0°C as the coolant for the chill roll.

The outdoor stability of the film was measured by the procedure given in Example 19. Thirty strips were placed on a wooden frame and the frame was placed on the roof on August 4. After 3 weeks of exposure to 10,200 Langley units at an average maximum temperature of 28.9°C the film degraded as evidenced by a tensile strength of less than 0.8 lb/in-mil and an elongation of 10%. Corresponding temperature-adjusted Langley units were 9,700.

EXAMPLE 26

A 4-foot wide polybutene film stabilized with 0.2% tri(nonylated phenyl)phosphite, 0.2% dilaurylthiodipropionate and 0.3% 2(3',5'5'-ditertiary-butyl-2-hydroxyphenyl)-5-chlorobenzotriazone was prepared -chlorobenzotriazole using commercial blown film equipment, slitting the film and winding the film onto 4-foot reels. The reels were transported to a farm near Mount Holly, N.J. in Burlington County. About ½ acre of land was fumigated on April 9, while laying down 4-foot wide strips of polybutene film with narrow rows of exposed soil in between the strips. About 20 days later young muskmelon plants were set through the plastic. The plastic raised the temperature in the root zone, conserved moisture and eliminated the necessity of hoeing. The polybutene film started to degrade at the beginning of August and had degraded completely by early September, eliminating the necessity of removing the film from the ground. The yield of muskmelon grown in land using the degradable film was increased by a factor of about 25% when compared to plants grown over bare ground. The yield of muskmelons using the degradable polybutene film was equivalent to the yield obtained using non-degradable clear polyethylene and was higher than obtained using black polyethylene film. Neither clear nor black polyethylene film degraded during this period and the polyethylene films had to be removed manually from the field.

EXAMPLE 27

A 3½ mil film made from polybutene stabilized with 0.2% octadecyl-3,5-di-t-butyl-4 hydroxycinnamate, 0.2% dilaurylthiodipropionate and 0.02% tri(nonylated phenyl)phosphite is especially suited for making fertilizer bags. Such a film degrades completely upon exposure to 16,000 temperature-adjusted Langley units of solar radiation over a period of about 1½ months.

EXAMPLE 28

A 20-mil film made from polybutene stabilized with 0.05% di-t-butyl-paracresol is especially suited for making a holder for a six-pack of beer cans. The polybutene six-pack holder was dumped on a garbage dump in August. Such a film, after exposure to 15,000 temperature-adjusted Langley units of solar radiation will degrade completely in about 5 weeks.

EXAMPLE 29

Polybutene (400 grams) stabilized with 0.18% tri(nonylated phenyl)phosphite and 0.18% dilaurylthiodipropionate was ground in a grinder and dry blended with 2.0 grams of find particle size channel carbon black. The dry blend was extruded at 210°C through a ¼-inch rod die. The rod was ground into pellets and fed into an extruder to make film of about 2 mil thickness by the procedure used to make clear film. The film was subjected on July 7 to the outdoor stability test described hereinabove. After exposure to 8,510 Langley units at an average ambient maximum temperature of 27.8°C, to 14,850 Langley units at an average maximum temperature of 28.9°C, to 11,040 Langley units at an average maximum temperature of 24.4°C and to 4,530 Langley units at an average ambient maximum temperature of 18.3°C, the film degraded as shown by a tensile strength of 0.2 lb/in-mil and an elongation of 5%. This exposure corresponds to 31,420 TALU.

EXAMPLE 30

400 grams of the stabilized polybutene of Example 1 was dry blended with 2 grams of fine particle size channel carbon black, extruded into rod, pelletized and made into film by the procedure given in Example 29. The film was tested for outdoor stability by the procedure given hereinabove.

The film degraded as shown by a tensile strength of 0.6 lb/in-mil and an elongation of 10% after exposure to 8,510 Langley units at an average ambient maximum temperature of 27.8°C and 14,850 Langley units at an average maximum temperature of 28.9°C and 800 Langley units at an average ambient temperature of 24.4°C. Corresponding temperature-adjusted Langley units were 22,200.

Similar results were obtained for polybutene stabilized with 0.05% di-t-butyl-para-cresol.

EXAMPLE 31

Polybutene as described in Example 29 was dry blended with 0.4 gram channel black and treated in the manner described in Example 29. After exposure to 8,510 Langley units at an average maximum temperature of 27.8°C and to 14,850 Langley units at an average maximum temperature of 28.9°C and 800 Langley units at an average ambient temperature of 24.4°C, the film degraded as shown by a tensile strength of 0.6 lb/in-mil and an elongation of 10%. This exposure to degradation corresponds to 22,200 TALU.

EXAMPLE 32

Polybutene stabilized with 0.05% di-t-butyl-paracresol and 0.10% distearylthiodipropionate will give blow molded bottles which can be stored under usual conditions for 3 months in a warehouse, 1 month in a retail store, and finally 1 month in the home. Thereafter the bottle will degrade completely in less than three months of outdoor exposure.

EXAMPLE 33

Polybutene stabilized with 0.06% 1,3,5-trimethyl-2,4,6-tris(3,5-di-t-butyl-4-hydroxybenzyl)benzene and 0.02% paranonyl-phenyl di-para-octylphenyl)phosphite will give injection molded clear cups which will degrade completely in less than 3 months of outdoor exposure.

EXAMPLE 34

A 4-foot wide blown polybutene film stabilized with 0.10% 2,2'-methylene bis(4-methyl-6-t-butylphenyl), 0.15% dilaurylthiodipropionate and 0.02% tri(-nonylated phenyl) phosphite was applied in early April in New Jersey over a field seeded for sweet corn and to which a weed killer had been applied. After about 2 months, the film was punctured, the plants pulled through the film and the sweet corn was picked in the latter part of June and early July. The plastic had degraded by early July. The clear mulch film provides 8–10 days earlier maturity than unmulched corn.

EXAMPLE 35

A 4-foot wide blown polybutene film stabilized with 0.04% di-t-butyl-paracresol is especially suited for covering fields seeded for tomato plants, to which fields weed killer had previously been applied. Shortly after the tomato plants come through the plastic, the plastic film degrades completely due to its low stabilizer content.

EXAMPLE 36

100 parts of polybutene compounded with 0.05 part di-t-butyl-p-cresol and 10 parts 2,4-D amine can be extruded into rod, pelletized and extruded into 4-foot wide film. If the film is placed on ground which has been seeded with corn, it will be punctured when the corn starts to grow. When the corn plants are about one month old the film will start to break down and release the herbicide to attack weed growth.

EXAMPLE 37 a. 100 parts of polybutene can be compounded with 20 parts of the herbicide dimethyl ester of tetrachloroterephthalic acid and 0.04 part of di-t-butyl-p-cresol, extruded into rod and pelletized.

b. After the ground is fumigated and muskmelons are transplanted through a clear polybutene film, the pellets produced in (a) can be tossed between rows of the clear film used to grow the muskmelon. After about 4 weeks the pellets embrittle permitting the herbicide to be leached out at a slow rate, thus serving to control weed growth between the rows of muskmelon plants and to prevent loss of moisture and soil nutrients.

c. Herbicide-containing polymer compositions similar to (a) may be extruded into about 1-foot wide strips of film and placed between the rows of plants. The film may be held down by dirt about every 4 feet. This type of film effectively serves as a degradable vehicle which functions to release herbicides or other agricultural chemicals in a controlled and predictable manner.

EXAMPLES 38–41

In Example 38, 80% of a polybutene resin containing 0.02% tri(nonylated phenyl)phosphite and 0.2% dilaurylthiodipropionate was dry blended with 20% of a low density polyethylene containing 0.001% butylated hydroxytoluene, and the mixture was extruded into film about two mils thick. In Example 39, a similar film of a polybutene-polyethylene blend was extruded, except that polybutene-polyethylene ratio was 60%/40%.

In Example 40, 80% of a polybutene resin containing 0.02% tri(nonylated phenyl)phosphite and 0.2% dilaurylthiodipropionate was dry blended with 20% of a mixture of an unstabilized polypropylene resin with 0.05% di-t-butyl-p-cresol. The dry blend was extruded to give film about 2 mils thick.

Example 41 was a control consisting of 2-mil film extruded from a polybutene resin containing 0.02% tri(-nonylated phenyl)phosphite and 0.2% dilaurylthiodipropionate.

Samples of the films were exposed on September 8 at Princeton, N.J., and degradation rates measured as in the test procedure described for Example 1. As is apparent from the results in Table IV, blends of polybutene with other polyolefins such as polyethylene and polypropylene can be usefully employed in embodiments of the present invention.

Table IV

| Example No. | Polymer Blend, % | | | TALU to Degradation |
|---|---|---|---|---|
| | Polybutene | Polyethylene | Polypropylene | |
| 38 | 80 | 20 | | 14,000 |
| 39 | 60 | 40 | | 18,000 |
| 40 | 80 | | 20 | 13,000 |
| 41 | 100 | | | 13,000 |

Table IV shows that so long as large amounts of butene polymer are included in the blend, it will degrade quickly, i.e. the results are not a weighted average but rather the butene is disproportionately effective.

EXAMPLE 42

Polybutene film stabilized with 0.04% 1,3,5-trimethyl-2,4,6-tris (3,5-di-t-butyl-4-hydroxybenzyl)-benzene and 0.02% tri(nonylated phenyl) phosphite can be applied in early April in a field in Colorado over the soil immediately after planting sugar beets using a frame to keep the film about 3–9 inches (preferably about 6 inches) above the soil. Within four weeks, the polybutene film degrades completely, a protective cover being desired only for about 4 weeks. The sugar beet plants will emerge sooner than do unprotected plants, and by mid-June the plants protected with plastic film will produce more root and leaf area. Plants thus covered with plastic film have been observed to yield over 25% more sucrose than unprotected sugar beet plants. If desired, the frame used to support the film can also be fabricated from degradable polybutene according to the present invention.

EXAMPLE 43

Polybutene resin pellets of the properties identified in Example 1 can be mixed, by weight, with 0.15% of 2,6-di tert.-butyl-4-methylphenol, 0.15% of tri(-nonylated phenyl)phosphite, 0.15% of dilaurylthiodipropionate and 0.70% of [2,2'-thiobis (4-tert-octylphenylate)] n-butylamine nickel II, a stabilizer system normally used for certain film applications with polypropylene. The mixture is extruded at 230°C. in a 1-inch Killion extruder through a rod die to form a homogeneous rod which is ground into pellets. The extrusion and grinding procedure is repeated four more times and the pellets are extruded through a film die. The resulting film has a stability of less than 50,000 TALU. The same procedure, omitting the four repetitions of extrusion and grinding, yields a film which has a stability in excess of 100,000 TALU.

It will be appreciated that the instant specification and examples are set forth by way of illustration and not limitation and that various modifications and changes may be made without departing from the spirit and scope of the present invention.

What is claimed is:

1. In the growing of an agricultural crop in a field in which the field is at least partially covered with a plastic film for a predetermined growth period, the improvement which comprises ascertaining, from the meteorological data for the geographic area in which said field is located, the amount of TALU for said predetermined growth period, and covering said field with a film having a thickness up to about 100 mils and comprising a polymer comprising at least about 75% by weight of units of butene-1, being over 50% isotactic and having a molecular weight in excess of about 40,000, and about 0.01 to 5% by weight of a stabilizer, the thermal treatment of said polymer prior to the time when it is applied to said field as a film having been such as to reduce its initial stability by at least about 5,000 TALU, said film having a stability approximately that of the TALU determined but at least about 5,000 but not in excess of about 70,000 TALU, whereby the film will degrade after said predetermined growth period, the degradation being accelerated or decelerated in accordance with an acceleration or deceleration of crop growth due to climactic conditions.

2. The process of claim 1 wherein the film has a stability of at least about 10,000 TALU.

3. The process of claim 2 wherein the polymer is substantially butene-1 homopolymer.

* * * * *